(12) United States Patent
Kawamoto

(10) Patent No.: US 8,100,593 B2
(45) Date of Patent: Jan. 24, 2012

(54) SPEED REDUCING MECHANISM, DRIVE DEVICE, AND OPTICAL INSTRUMENT

(75) Inventor: Hisashi Kawamoto, Chiba (JP)

(73) Assignee: Seiko Precision Inc., Narashino-Shi (JP)

( * ) Notice: Subject to any disclaimer, the term of this patent is extended or adjusted under 35 U.S.C. 154(b) by 0 days.

(21) Appl. No.: 12/760,882

(22) Filed: Apr. 15, 2010

(65) Prior Publication Data

US 2010/0195182 A1    Aug. 5, 2010

Related U.S. Application Data

(63) Continuation of application No. PCT/JP2009/058648, filed on May 7, 2009.

(30) Foreign Application Priority Data

Jul. 1, 2008    (JP) .................................. 2008-172355

(51) Int. Cl.
*G03B 9/10*    (2006.01)

(52) U.S. Cl. ........................................................ 396/453

(58) Field of Classification Search .................. 396/452, 396/458, 505, 510
See application file for complete search history.

(56) References Cited

U.S. PATENT DOCUMENTS

| | | | | |
|---|---|---|---|---|
| 820,789 A | * | 5/1906 | Hutchens | 74/460 |
| 2,797,618 A | * | 7/1957 | Bloomberg et al. | 359/670 |
| 3,406,583 A | * | 10/1968 | Baier | 74/411 |
| 5,452,622 A | * | 9/1995 | Fenelon | 74/411 |
| 5,863,008 A | * | 1/1999 | Park | 242/356 |
| 6,266,486 B1 | * | 7/2001 | Kohno | 396/72 |
| 6,779,933 B2 | * | 8/2004 | Sato et al. | 396/463 |

FOREIGN PATENT DOCUMENTS

| | | |
|---|---|---|
| CN | 2380933 | 5/2000 |
| JP | 57-19720 | 2/1982 |
| JP | 61-180229 | 8/1986 |
| JP | 9-50065 | 2/1997 |
| JP | 2004-170730 A1 | 6/2004 |
| JP | 2005-284188 A1 | 10/2005 |
| JP | 2005284102 A * | 10/2005 |
| JP | 2007-310171 A1 | 11/2007 |

OTHER PUBLICATIONS

International Search Report for International Application No. PCT/JP2009/058648 dated Jun. 15, 2009.
Chinese Office Action issued for corresponding Chinese patent application No. 200980101168.9 dated Apr. 28, 2011.

* cited by examiner

*Primary Examiner* — Clayton E Laballe
*Assistant Examiner* — Leon W Rhodes, Jr.
(74) *Attorney, Agent, or Firm* — Kratz, Quintos & Hanson, LLP

(57) ABSTRACT

A speed reducing mechanism includes: a driven member; and a decelerating member transmitting a drive force from an actuator to the driven member. The driven member includes an engagement pin. The decelerating member includes: a teeth portion engaging a rotor pinion portion serving as the drive force from the actuator; and a cam slot engaging the engagement pin. The decelerating member is rotatably supported and is formed into a sheet shape thinner than a face width of the rotor pinion portion.

7 Claims, 7 Drawing Sheets

SPEED REDUCING MECHANISM, DRIVE DEVICE, AND OPTICAL INSTRUMENT

CROSS-REFERENCE TO RELATED APPLICATION

This application is a continuation of and claims priority to International Patent Application No. PCT/JP2009/058648 filed on May 7, 2009, which claims priority to Japanese Patent Application No. 2008-172355 filed on Jul. 1, 2008, subject matter of these patent documents is incorporated by reference herein in its entirety.

BACKGROUND OF THE INVENTION

1. Field of the Invention

The present invention relates to speed reducing mechanisms, drive devices, and optical instruments.

2. Description of the Related Art

There is known a blade drive device as a drive device used in a camera. The blade drive device, for example, includes: a board including an opening; a blade adjusting the aperture of the opening; a drive ring for driving the blade. The drive ring is driven by receiving the drive force from an actuator. The driving of the drive ring causes the blade to drive, so that the aperture of the opening formed on the board is adjusted (See Japanese Unexamined Patent Publication No. 9-50065).

In the drive device disclosed in Patent Document 1, the drive force of the actuator is transmitted to the drive ring via plural decelerating gears. In this way, by using a reduction gear having the plural decelerating gears through which the drive force is transmitted, the accuracy of the stop position of the drive ring can be improved. The accuracy of the stop position of the drive ring is improved, thereby improving the accuracy of the position of the blade and the accuracy of adjusting the aperture of the opening.

However, since the drive device having such a speed reducing mechanism has plural decelerating gears which are meshed with each other, the operational noise is increased. Also, since the plural decelerating gears are overlapped in the optical axis direction, the space in the optical axis direction is necessary, and the number of the parts and the manufacturing cost are increased.

SUMMARY OF THE INVENTION

It is therefore an object of the present invention to provide a speed reducing mechanism, a drive device, an optical instrument, whereby the operational noise and the number of the parts are reduced, the size thereof is made thin, and a low cost is maintained.

According to an aspect of the present invention, there is provided a speed reducing mechanism including: a driven member; and a decelerating member transmitting a drive force from an actuator to the driven member; wherein: the driven member includes an engagement pin; the decelerating member includes: a teeth portion engaging a rotor pinion portion serving as the drive force from the actuator; and a cam slot engaging the engagement pin; and the decelerating member is rotatably supported and is formed into a sheet shape thinner than a face width of the rotor pinion portion.

DESCRIPTION OF THE PREFERRED EMBODIMENT

A description will be given of embodiments according to the present invention with reference to the drawings.

First Embodiment

In the following, a description will be given of embodiments according to the present invention with reference to the drawings.

First Embodiment

Figure 1:
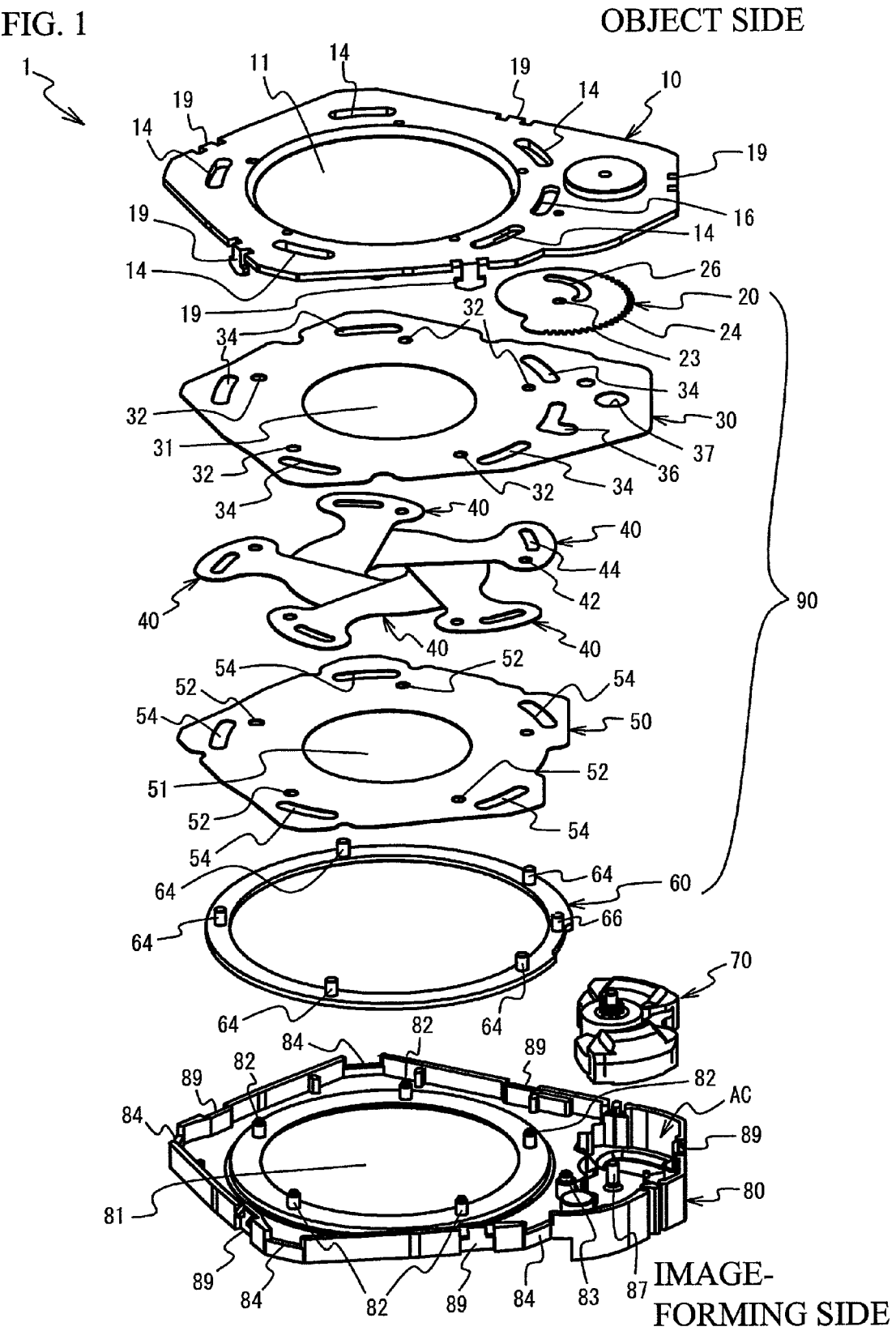
FIG. 1 is an exploded perspective view of the blade drive device 1 according to the first embodiment of the present invention.

In the following, a description will be given of a blade drive device 1 serving as a drive device according to the first embodiment of the present invention, with reference to the drawings. FIG. 1 is an exploded perspective view of the blade drive device 1 according to the first embodiment of the present invention. The blade drive device 1 according to the first embodiment of the present invention includes a shutter board 10, a decelerating member 20, a thin plate 30, five blades 40, a thin plate 50, a drive ring 60, an electromagnetic actuator 70, and a shutter board 80, which are arranged in this order from the object side to the image-forming side, when the object side is in the upper side of the drawing and the image-forming side is in the lower side of the drawing. When the blade drive device according to the first embodiment of the present invention is employed in a camera (optical instrument), an image pickup element (not illustrated) for imaging an object image is arranged at an image-forming side.

The decelerating member 20, the thin plate 30, the blades 40, the thin plate 50, the drive ring 60, and the electromagnetic actuator 70 are housed between the shutter boards 10 and 80. The shutter board 10, the thin plates 30 and 50, and the shutter board 80 are respectively formed with openings 11, 31, 51, and 81, for defining the optical path, at their centers. Additionally, each of the openings 31 and 51 is smaller than each of the openings 11 and 81. The drive force of the electromagnetic actuator 70 is transmitted to the plural blades 40 via the decelerating member 20 and the drive ring 60. They will be described later in detail. Also, the decelerating member 20 and the drive ring 60 serving as a driven member are included in a speed reducing mechanism 90. The speed reducing mechanism 90 is provided between the shutter boards 10 and 80.

When the drive force is transmitted to the blades 40, the plural blades 40 swing about given positions. The apertures of the openings 11, 31, 51, and 81 are thus adjusted. The adjustment of the aperture enables the amount of object light entering an image pickup element to be adjusted. That is, the blade drive device according to the present embodiment serves as an aperture device for adjusting the amount of light. Further, the thin plate 30 is arranged between the decelerating member 20 and the blades 40, and the thin plate 50 is arranged between the blades 40 and the drive ring 60. The thin plates 30 and 50 are arranged between drive parts in order to avoid the interference of the thin plate 30 with the thin plate 50. Each of the thin plates 30 and 50 has a sheet shape.

Figure 2:
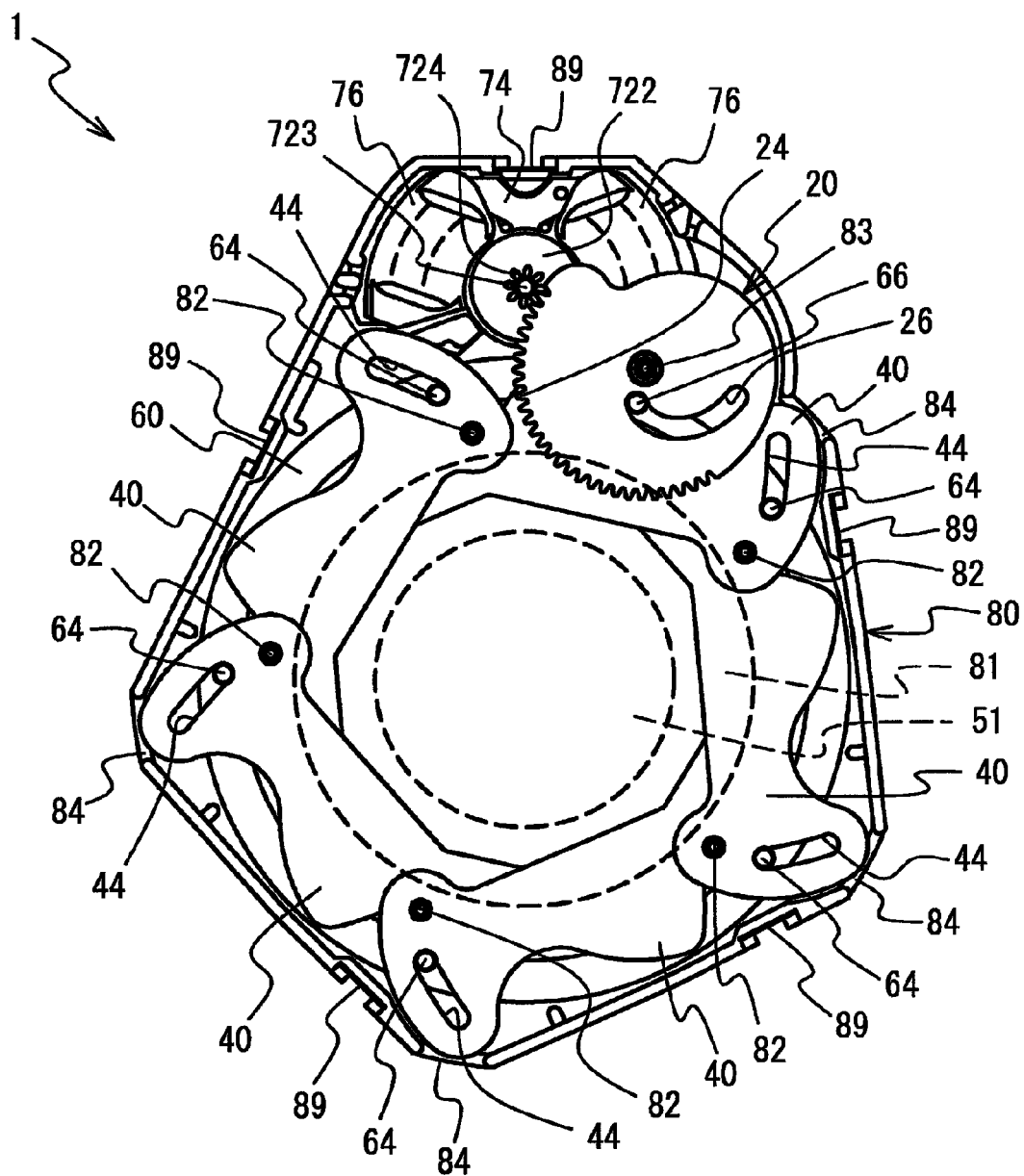
FIG. 2 is a front view of an internal structure of the blade drive device, according to the first embodiment, which has been assembled.
Figure 3:
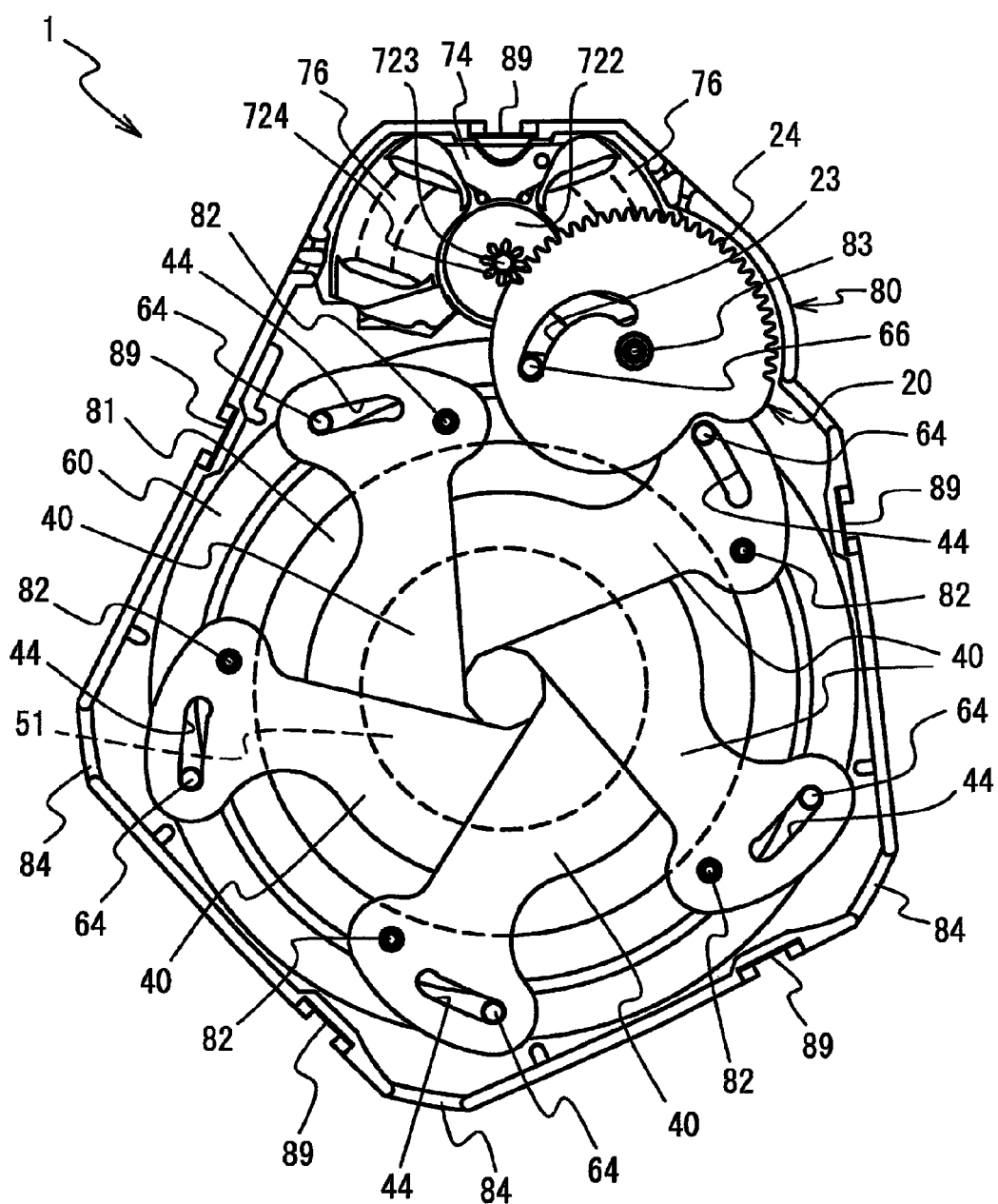
FIG. 3 is a front view of an internal structure of the blade drive device, according to the first embodiment, which has been assembled.
Figure 4:
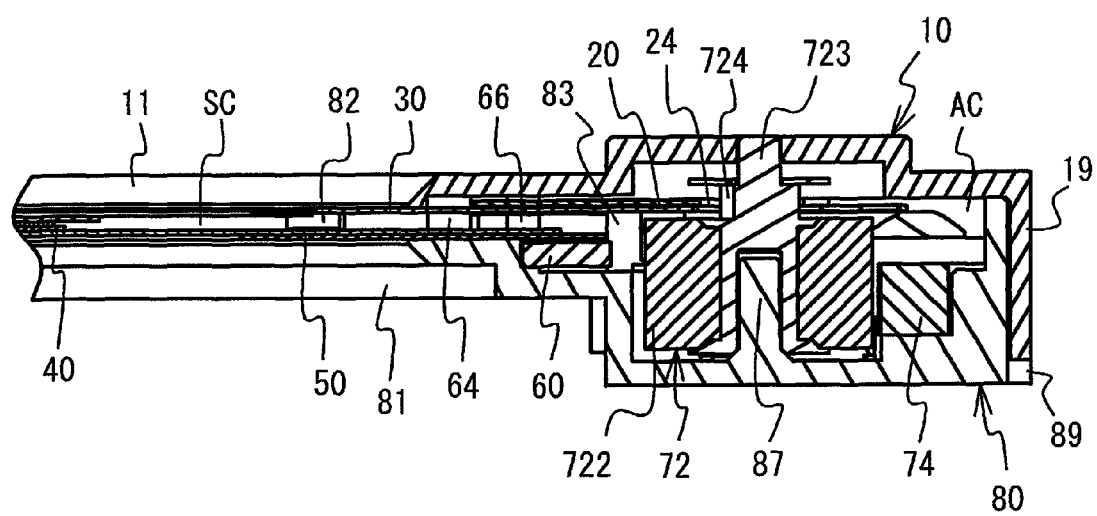
FIG. 4 is a cross-sectional view partially illustrating the assembled blade drive device according to the first embodiment.

FIGS. 2 and 3 are front views of an internal structure of the blade drive device which has been assembled. In FIGS. 2 and 3, the shutter board 10, and the thin plates 30 and 50 are omitted. However, the opening 51 of the thin plate 50 is indicated by a broken line. Additionally, FIG. 2 illustrates a fully opened state where the blades 40 recede from the opening 51. FIG. 3 illustrates a small aperture state where the blades 40 reach the opening 51. FIG. 4 is a cross-sectional view partially illustrating the assembled blade drive device.

As illustrated in FIGS. 1 and 4, the shutter board 80 is formed with an actuator chamber AC for housing the electromagnetic actuator 70. Further, a blade chamber SC for housing the plural blades 40 is formed between the shutter board 10 and the shutter board 80. The actuator chamber AC projects toward the image-forming side from the blade chamber SC in the optical axis direction, and is formed in a recess portion shape. The electromagnetic actuator 70 includes a rotor 72, a stator 74, coils 76 or the like as illustrated in FIGS. 2 to 4.

The rotor 72 includes: a cylindrical portion 722 which is formed in a cylindrical shape and which is magnetized to have different magnetic polarities in its circumferential direction; and a rotary shaft portion 723 which is integrally formed with the cylindrical portion 722. The cylindrical portion 722 and the rotary shaft portion 723 are integrally formed by insert molding. The cylindrical portion 722 is made of a magnet resin. The rotary shaft portion 723 is made of a synthetic resin with good slidability. For example, the rotary shaft portion 723 is made of a polyacetal resin. Further, a support spindle 87 is provided to stand within the actuator chamber AC of the shutter board 80. The rotary shaft portion 723 is slidably and rotatably supported by the support spindle 87. This supports the rotor 72 for rotation.

Additionally, the support spindles 82 are arranged at the inner side of the drive ring 60, as illustrated in FIGS. 2 and 3. This reduces the size of the shutter board 80 in its planer direction. Further, referring now to FIG. 2, plural cutouts 84 are formed at the periphery of the shutter board 80. The cutouts 84 are formed for avoiding the interference of the blades 40 in the fully opened state. This reduces the size of the shutter board 80.

Referring to FIGS. 2 to 4, the stator 74 is laterally U-shaped when viewed from its front side, and has both arms around which the coils 76 are respectively wound. The coils 76 are connected to a flexible printed substrate, not illustrated, for energization. The stator 74 is excited by the state where the coils 76 are energized. By the magnetically attractive force and repulsive force generated between the excited stator 74 and the rotor 72, the rotor 72 is rotated by a given amount.

Further, as illustrated in FIGS. 2 to 4, the rotary shaft portion 723 is integrally formed with a teeth portion 724 forming a rotor pinion portion. By the rotation of the rotor 72, the teeth portion 724 is rotated with the drive force of the electromagnetic actuator 70. Additionally, the thin plate 30 is formed with an escape hole 37 which permits the rotation of the rotary shaft portion 723, as illustrated in FIG. 1. The teeth portion 724 meshes and engages a teeth portion 24 formed in the decelerating member 20. The decelerating member 20 is formed with a spindle hole 23 at its substantial center, as illustrated in FIG. 1. Referring now to FIGS. 1 to 3, by engaging a support spindle 83 formed in the shutter board 80 with the spindle hole 23, the decelerating member 20 is rotatably supported. Also, the decelerating member 20 is formed with a cam slot 26. Here, the decelerating member 20 is formed into a sheet shape thinner than a thickness of the teeth portion 724 in the optical axis direction, that is, than a face width of the teeth portion 724. Specifically, the thickness of the decelerating member 20 is set from about 0.03 mm to about 0.15 mm, preferably, from 0.05 mm to 0.10 mm. Here, the material of the sheet shape may be flexible or non-flexible. For example, the material may be a polyacetal resin, a polyethylene terephthalate resin, or a metal, each of which is not flexible. In the present embodiment, the decelerating member 20 is made of a sheet shaped member with flexibility. The teeth portion 24 is formed in a range of a substantially half of the periphery of the decelerating member 20. The cam slot 26 is circular arc shaped with the spindle hole 23 used as a center. That is to say, the cam slot 26 is formed between the teeth portion 24 and the rotation center of the decelerating member 20.

When the teeth portion 724 rotates, the decelerating member 20 is rotated by the engagement of the teeth portion 724 with the teeth portion 24. The rotation of the decelerating member 20 enables a driven pin 66 (engagement pin) engaging the cam slot 26 to rotate around the optical axis. The driven pin 66 is provided to stand on the drive ring 60. When the decelerating member 20 rotates clockwise from the fully opened state illustrated in FIG. 2, the driven pin 66 revolves counterclockwise about the optical axis. That is, the drive ring 60 rotates counterclockwise.

Also, the drive ring 60 is formed with drive pins 64 corresponding to the number of the blades 40. The drive pins 64 are formed on the drive ring 60 at substantially even intervals. The drive pins 64 engage engagement slots 44 formed in the blades 40, respectively. Additionally, a spindle hole 42 is formed in the blade 40, as illustrated in FIG. 1, and engages the fixed spindle 82 formed in the shutter board 80. Accordingly, the blades 40 are supported for swinging about the fixed spindles 82, respectively.

In addition, referring now to FIG. 1, the shutter board 10, and the thin plates 30 and 50 are respectively formed with escape holes 14, 34, and 54, which are provided for permitting the movements of the drive pins 64. The shutter board 10 and the thin plate 30 are respectively formed with escape holes 16 and 36, which are provided for permitting the movement of the driven pin 66. The escape hole 36 has an L shape, as illustrated in FIG. 1. The thin plates 30 and 50 are respectively formed with escape holes 32 and 52 into which the fixed spindles 82 are inserted. Further, engagement pawls 19 are formed at the periphery of the shutter board 10, and engagement portions 89 which respectively engage the engagement pawls 19 are formed at the periphery of the shutter board 80. By the engagement of the engagement pawls 19 with the engagement portions 89, the blade drive device 1 is assembled.

When the drive ring 60 rotates counterclockwise from the fully opened state, the drive pins 64 move counterclockwise around the optical axis. In response thereto, the blades 40 swing about the support spindles 82 toward the center of the opening 51. In this way, the aperture of the opening 51 is adjusted. Also, by controlling the rotational position of the electromagnetic actuator 70, the aperture of the opening 51 can be continuously adjusted.

In addition, as mentioned above, each of the openings 31 and 51 is smaller than each of the openings 11 and 81. Further, the openings 11 and 81 have a substantially identical diameter, and the openings 31 and 51 also have a substantially identical diameter. Thus, the amount of light is defined by the openings 31 and 51 in the fully opened state.

In the fully opened state illustrated in FIG. 2, the driven pin 66 comes into contact with one end of the cam slot 26, and the plural drive pins 64 come into contact with one ends of the escape holes 14, 34, and 54. In the small aperture state illustrated in FIG. 3, the driven pin 66 comes into contact with the other end of the cam slot 26, and the plural drive pins 64 come into contact with the other ends of the escape holes 14, 34, and 54. As mentioned above, the movements of the blades 40 are limited between the fully opened state illustrated in FIG. 2 and the small aperture state illustrated in FIG. 3. In this manner, members come into contact with each other at plural points, thereby preventing concentration of load on a given part.

As described above, the drive force from the electromagnetic actuator 70 is transmitted to the drive ring 60 via the single decelerating member 20. In this way, the drive force from the electromagnetic actuator 70 is transmitted to the drive ring 60 by the single decelerating member 20, thereby reducing the number of the parts. A conventional blade drive device transmits the drive force from an actuator to a drive ring via plural gears. However, the drive force is transmitted by the single decelerating member 20 in the blade drive device according to the present embodiment. In this way, only the teeth portion 724 and the teeth portion 24 are meshed with each other, thereby reducing the operational noise. Further, the number of the parts is reduced, thereby reducing the manufacturing cost. Moreover, the number of the parts is reduced, thereby achieving a lightweight.

In addition, the cam slot 26 and the driven pin 66, which are respectively formed in the decelerating member 20 and the drive ring 60, engage each other, so the drive force from the electromagnetic actuator 70 is transmitted to the drive ring 60. Since the conventional blade drive device employs plural decelerating gears, the impact sound is large. For this reason, it is difficult to reduce the operational noise. However, in the blade drive device according to the present embodiment, the drive force is transmitted by the engagement of the cam slot 26 with the driven pin 66 without a gear. Accordingly the operational noise is reduced as compared to the conventional one.

Also, the decelerating member 20 has a thin sheet shape with flexibility. For this reason, the area in contact with the teeth portion 724 and the teeth portion 24 is small and the decelerating member 20 is also bendable. Therefore, when the teeth portion 724 and the teeth portion 24 mesh each other, the impact generated by engaging the cam slot 26 with the driven pin 66 is absorbed. In this way, the operational noise of the blade drive device 1 is reduced as compared to the conventional blade drive device. Further, the speed reducing mechanism 90 is provided between the shutter boards 10 and 80, thereby reducing the thickness of the blade drive device 1 in the optical axis direction.

Since the operation noise is reduced in this way, for example, when the blade drive device according to the present embodiment is employed in a camera having a movie recording function, the possibility of recoding the operational noise of the blade drive device is avoidable during the time of movie recording. Moreover, the number of the parts is reduced, thereby achieving a lightweight, for example, when the blade drive device according to the present embodiment is employed in an electronic portable device. This also improves the impact resistance.

Further, the decelerating member 20 has the thin sheet shape. Thus, unlike the conventional one, the blade drive device is reduced in thickness by the configuration without a decelerating gear overlapped on the drive ring in the optical axis direction. Herein, the decelerating gear employed in the conventional blade drive device can be shaped to be thin. The decelerating gear employed in the conventional blade drive device has a large diameter teeth portion and a small diameter teeth portion which are arranged in the axial direction. Even if such a decelerating gear is shaped to be thin, the thickness of the large diameter teeth portion and that of the small diameter teeth portion will be needed.

Additionally, as illustrated in FIG. 4, the decelerating member 20, the blades 40, and the drive ring 60 are arranged in the thickness of the electromagnetic actuator 70 in the optical axis direction by employing the decelerating member 20 having the sheet shape. That is, the decelerating member 20, the blades 40, and the drive ring 60 can be arranged right beside the electromagnetic actuator 70. Moreover, the decelerating member 20 is thinner than the face width of the teeth portion 724. This also reduces the thickness of the blade drive device in the optical axis direction.

Further, referring to FIGS. 2 and 3, at least a part of the decelerating member 20 overlaps the blades 40 and the drive ring 60 in the optical axis direction. This achieves the downsizing in the planar direction perpendicular to the optical axis. Furthermore, since the decelerating member 20 is formed into the sheet shape as mentioned above, even when at least a part of the decelerating member 20 overlaps the blades 40 and the drive ring 60 in the optical axis direction, the thin shape is maintained in the optical axis direction. Also, the reason why the decelerating member 20 and the drive ring 60 are arranged to overlap each other is that the drive force is transmitted to the decelerating member 20 and the drive ring 60 by engaging the cam slot 26 with the driven pin 66.

As described above, the blade drive device according to the present embodiment is suitable for being employed in a small-sized electronic device such as a mobile phone.

In addition, since the decelerating member 20 is arranged to overlap the blades 40 and the drive ring 60 in the optical axis direction, the decelerating member 20 can be enlarged in the planar direction. This permits a pitch circle radius of the teeth portion 24 to be large. This also enlarges the speed reduction ratio between the rotor 72 and the decelerating member 20. The speed reduction ratio is enlarged, thereby decelerating the drive force of the electromagnetic actuator 70 and transmitting the drive force to the drive ring 60. Therefore, the positional accuracy of the blades 40 is improved. Consequently, the control accuracy of the aperture is improved.

As illustrated in FIGS. 2 to 4, the speed reducing mechanism 90 according to the first embodiment also includes the drive ring 60 serving as a driven member and the decelerating member 20 transmitting the drive force from the electromagnetic actuator 70 to the drive ring 60. The drive ring 60 has the driven pin 66 serving as an engagement pin. Also, the decelerating member 20 has the teeth portion 24 which engages the teeth portion 724 defining the rotor pinion portion serving as the drive source from the electromagnetic actuator 70. Further, the decelerating member 20 is thinner than the face width of the teeth portion 724, and is formed into the sheet shape. Furthermore, the decelerating member 20 has the teeth portion 24, to which the drive force is transmitted from the electromagnetic actuator 70, and the cam slot 26, which engages the driven pin 66. The decelerating member 20 is rotatably supported by engaging the spindle hole 23 with the support spindle 83 formed on the shutter board 80.

With such a configuration of the speed reducing mechanism 90, the drive force is transmitted from the electromagnetic actuator 70 to the drive ring 60 by the single decelerating member 20, thereby reducing the number of the parts and the number of the meshing points. Thus, the operational noise is reduced. Further, the decelerating member 20 is formed into the sheet shape thinner than the face width of the teeth portion 724, thereby reducing the speed reducing mechanism 90 in thickness. Furthermore, the decelerating member 20 has flexibility, thereby absorbing the impact generated by the meshing of the teeth portion 724 with the teeth portion 24 or by the engagement of the cam slot 26 with the driven pin 66. This further reduces the operational noise. Moreover, the number of the parts is reduced, thereby maintaining a low manufacturing cost, and thereby achieving a lightweight.

Figure 5A:
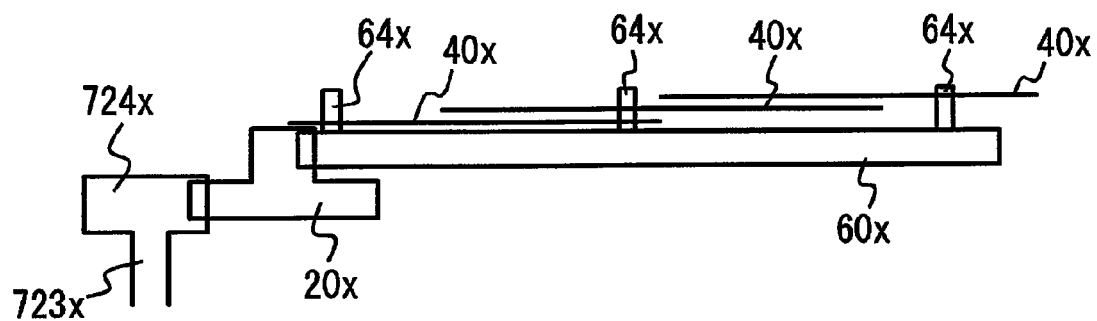
FIGS. 5A to 5C are schematic views of conventional blade drive devices.
Figure 5B:
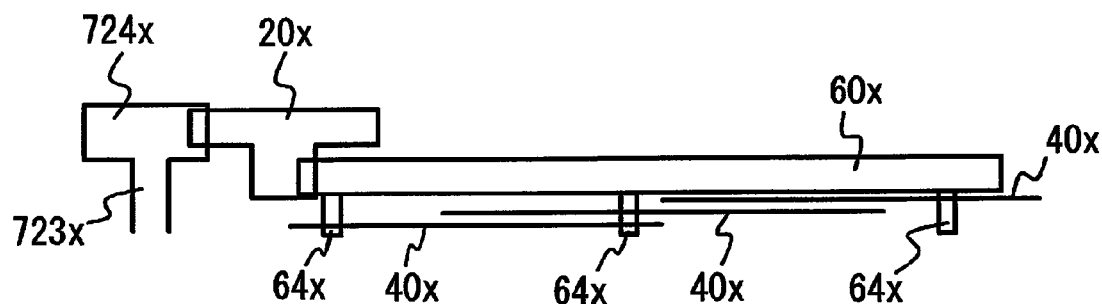
Figure 5C:
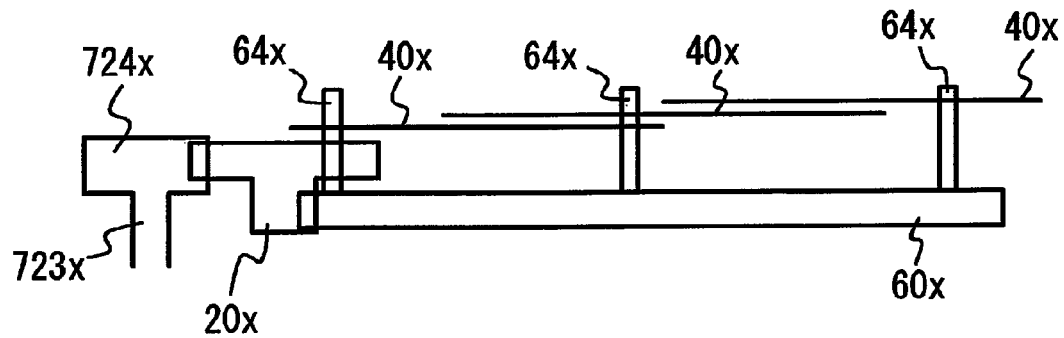

Next, a description will be given of a difficulty in arranging a decelerating gear, a drive ring, a blade and the like right beside an actuator in a conventional blade drive device. FIGS. 5A to 5C are schematic views of the conventional blade drive devices. Referring to FIG. 5A, a decelerating gear 20x is arranged right beside a pinion gear 724x into which a rotary shaft 723x is press fitted. The decelerating gear 20x has a large diameter teeth portion and a small diameter teeth portion which are arranged in the height direction. The decelerating gear 20x is rotated by engaging the pinion gear 724x with the large diameter teeth portion. The small diameter teeth portion of the decelerating gear 20x meshes a teeth portion formed at the periphery of a drive ring 60x. Therefore, the rotation of the decelerating gear 20x is further decelerated and transmitted to the drive ring 60x. Plural drive pins 64x, which are formed in the drive ring 60x, moves in conjunction with the rotation of the drive ring 60x. The blades 40x swing in conjunction with the movement of the drive pins 64x. In the conventional blade drive device, the decelerating gear 20x or the like is not arranged beside the actuator, as illustrated in FIG. 5A. This is a factor that the thickness is increased in the optical axis direction.

For example, when the decelerating gear 20x, the blades 40x, and the drive ring 60x are intended to be arranged right beside the actuator, it is conceivable that the small diameter teeth portion of the decelerating gear 20x is arranged to face downwardly and the drive pins 64x of the drive ring 60x are also arranged to face downwardly, as illustrated in FIG. 5B. However, such arrangements need an assembling step as follows. Plural blades 40x are beforehand arranged at given positions of a board (not illustrated), and then the plural drive pins 64x formed on the drive ring 60x are inserted into spindle holes respectively formed on the plural blades 40x. In this way, the drive ring 60x has to be assembled. Such an assembling work is complicated. If the drive pin 64x is not inserted into the spindle hole of the blade 40x, the blade 40x with a film shape may be broken.

Additionally, as illustrated in FIG. 5C, the decelerating gear 20x might be arranged such that the small diameter teeth portion daces downwardly and the drive ring 60x might be arranged such that the drive pins 64x face upwardly as with the conventional case. However, these arrangements will cause the large diameter teeth portion to interfere with the blade 40x. In order to avoid this interference, the blades 40x have to be set in such a position in height, in the optical axis direction, so as not to interfere the decelerating gear 20x. Accordingly, these arrangements are a factor of increasing the blade drive device in thickness in the optical axis direction.

As described above, in the conventional blade drive device, it is difficult to arrange the decelerating gear, the drive ring, and the blade right beside the actuator. However, in the blade drive device according to the present embodiment, since the decelerating member 20 has the sheet shape, it is possible to arrange the decelerating member 20, the blades 40, and the drive ring 60 right beside the electromagnetic actuator 70.

In addition, referring to FIGS. 1 and 4, the decelerating member 20 and the blades 40 are arranged at the same side with respect to the drive ring 60, that is, at the object side. For this reason, in the assembling step, the electromagnetic actuator 70 and the drive ring 60 are arranged on the shutter board 80, and then the thin plate 50, the blades 40, the thin plate 30, the decelerating member 20, and the shutter board 10 are assembled in this order. In the assembling of the blades 40, the blade 40 is arranged such that the drive pin 64 formed on the drive ring 60 is inserted into the spindle hole 42 of the blade 40. Further, in the assembling of the decelerating member 20, the decelerating member 20 is arranged such that the driven pin 66 of the drive ring 60 engages the cam slot 26 of the decelerating member 20. In this way, the assembling work is performed with ease.

Second Embodiment

Figure 6:
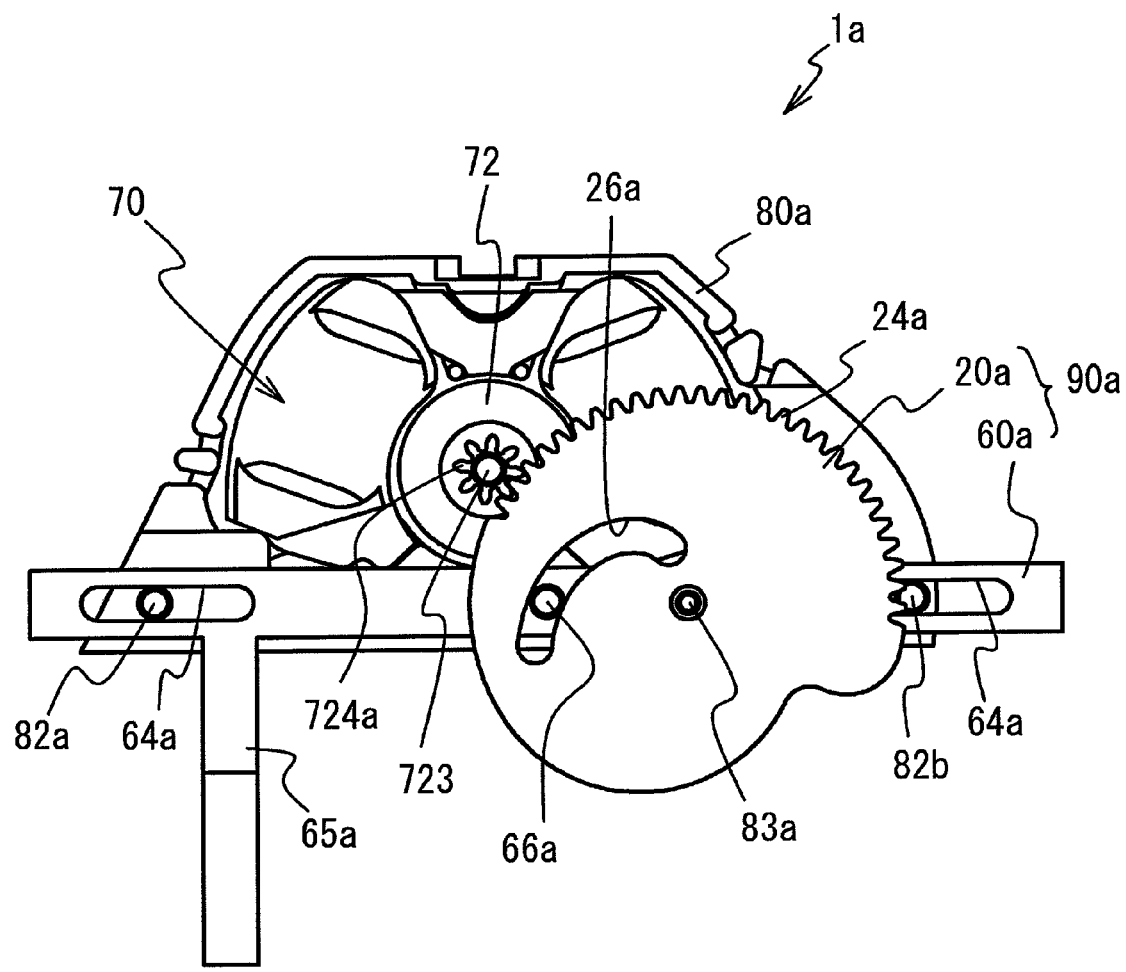
FIG. 6 is a front view of a lens drive device according to the second embodiment.
Figure 7:
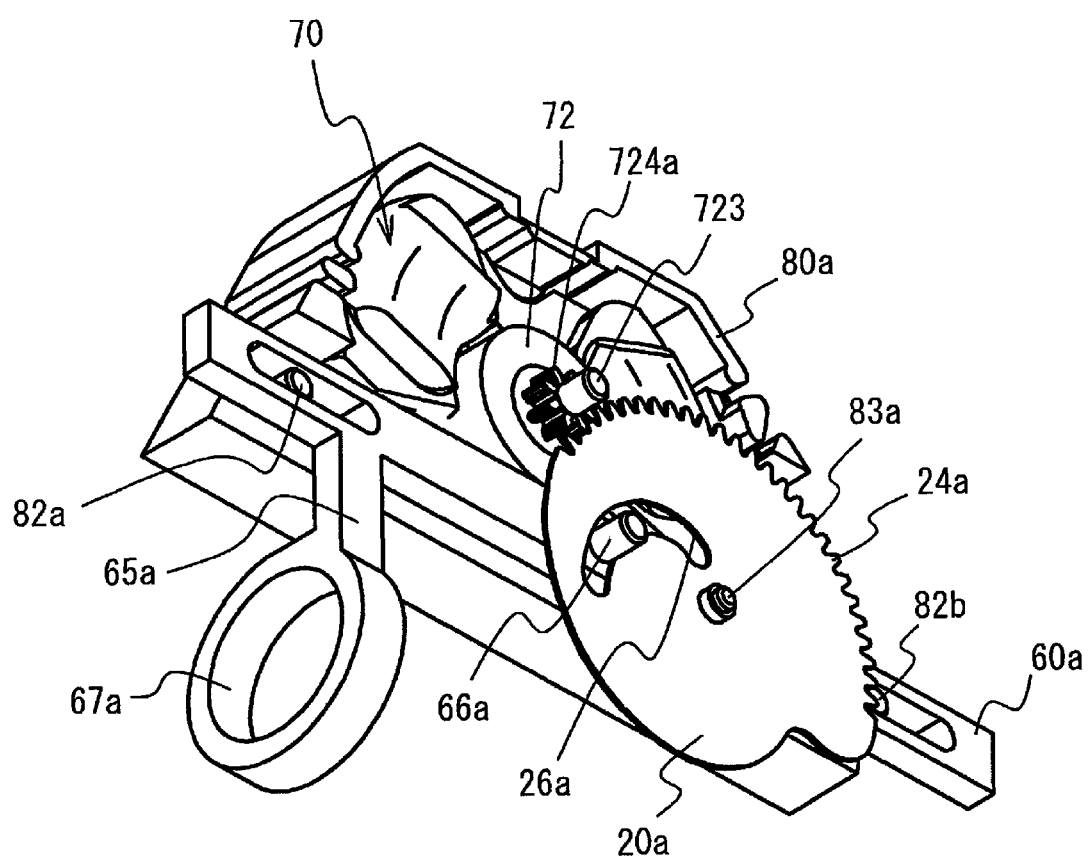
FIG. 7 is a perspective view of the lens drive device according to the second embodiment.

Next, a description will be given of a lens drive device 1a serving as a drive device according to the second embodiment. FIG. 6 is a perspective view of the lens drive device 1a according to the second embodiment of the present invention. FIG. 7 is a perspective view of the lens drive device 1a. Additionally, regarding the embodiment as described later, the like components in the blade drive device 1 according to the first embodiment are designated with the same reference numerals, in order to omit duplication description.

Referring now to FIGS. 6 and 7, the lens drive device 1a includes a shutter board 80a, a decelerating member 20a, a drive ring 60a, and the electromagnetic actuator 70. A speed reducing mechanism 90a includes: the drive ring 60a serving as a driven member; and the decelerating member 20a transmitting the drive force from the electromagnetic actuator 70 to the drive ring 60a.

Referring to FIGS. 6 and 7, the rotary shaft portion 723 is also integrally formed with a teeth portion 724a, and the rotation of the rotor 72 enables the teeth portion 724a to rotate. The teeth portion 724a meshes a teeth portion 24a formed in the decelerating member 20a. The decelerating member 20a has a spindle hole at its substantial center, and is rotatably supported by engaging a support spindle 83a formed on the shutter board 80a. Further, the decelerating member 20a is formed with a cam slot 26a. The decelerating member 20a is thinner than the face width of the teeth portion 724, and is formed into a sheet shape. Herein, like the first embodiment, the material of the sheet shape may be flexible or non-flexible. For example, the material may be a polyacetal resin, a polyethylene terephthalate resin, or a metal, which are not flexible. In the present embodiment, the decelerating member 20a is made of the sheet shaped member with no flexibility.

When the teeth portion 724a rotates, the meshing of the teeth portion 724a with the teeth portion 24a causes the decelerating member 20a to rotate. Herein, a driven pin 66a serving an engagement pin is provided to stand on the drive ring 60, and engages the cam slot 26a of the decelerating member 20a. Further, linear guide pins 82a and 82b are provided to stand on the shutter board 80a, and respectively engage linear guide portions 64a formed in the drive ring 60a. As illustrated in FIG. 6, the drive ring 60a is attached to the shutter board 80 so as to linearly slide in the right and left directions. When the decelerating member 20a rotates counterclockwise from the state illustrated in FIG. 6, the driven pin 66a moves in the right direction in conjunction with the movement of the engagement point of the driven pin 66a with the cam slot 26a. That is, the drive device according to the second embodiment of the present invention has the speed reducing mechanism 90a which allows the drive member to move linearly.

Herein, in the lens drive device 1a, the drive ring 60a are provided with a lens attaching portion 67a which holds a lens and a lens frame, not illustrated, via an arm portion 65a. By controlling the rotational position of the electromagnetic actuator 70, the linear position of the drive ring 60a which has the lens attaching portion 67a holding the lens is controlled, so the position of the lens can be adjusted.

With such a configuration, in the lens drive device 1a according to the second embodiment of the present invention, the single decelerating member 20a transmits the drive force from the electromagnetic actuator 70 to the drive ring 60a, thereby reducing the number of the parts and the number of the meshing points. Thus, the operational noise is reduced. Additionally, the single decelerating member 20a has the thin sheet shape, thereby reducing the lens drive device 1a in thickness, specifically, the speed reducing mechanism 90a portion. Moreover, the number of the parts is reduced, thereby maintaining a low manufacturing cost, and thereby achieving a lightweight. Further, in case where the decelerating member 20a has flexibility, the impact, which is generated by the meshing of the teeth portion 724a with the teeth portion 24a or by the engagement of the cam slot 26a with the driven pin 66a, is absorbed. This further reduces the operational noise.

While the preferred embodiments of the present invention have been illustrated in detail, the present invention is not limited to the above-mentioned embodiments, and other embodiments, variations and modifications may be made without departing from the scope of the present invention.

The present embodiment exemplifies the rotor 72 which includes the cylindrical portion 722 and the rotary shaft portion 723 that are integrally formed by insert molding. However, the rotor and the rotary shaft may be separated from each other, and then they are integrally formed by press fitting or the like. In addition, in the present embodiment, the rotary shaft portion 723 is integrally formed with the teeth portion 724. However, the present invention is not limited to such a configuration, for example, the rotary shaft may be press fitted into the pinion gear.

The present embodiments exemplify the blade drive device and the lens drive device serving as the drive device which uses the speed reducing mechanism according to the present invention. However, the drive device is not limited to them, and may employ, for example, a shutter drive device, which adjusts the amount of light within an opening by driving a shutter blade or a ND filter to control the amount of object light entering an image pickup element.

Finally, several aspects of the present invention are summarized as follows.

According to an aspect of the present invention, there is provided a speed reducing mechanism including: a driven member; and a decelerating member transmitting a drive force from an actuator to the driven member, wherein: the driven member includes an engagement pin; the decelerating member includes: a teeth portion engaging a rotor pinion portion serving as the drive force from the actuator; and a cam slot engaging the engagement pin; and the decelerating member is rotatably supported and is formed into a sheet shape thinner than a face width of the rotor pinion portion.

With such a speed reducing mechanism having the above configuration, the single decelerating member transmits the drive force from the actuator to the driven member. Also, by engaging the engagement pin formed in the driven member with the cam slot of the decelerating member, the drive force from the actuator is transmitted to the driven member. This reduces the number of the parts and reduces the meshing points. In response thereto, the operational noise caused by the meshing of the gears is reduced. Further, the speed reducing mechanism is reduced in thickness by the decelerating member which has the sheet shape thinner than the face width of the rotor pinion portion, and the number of the parts is reduced. This maintains a low cost and achieves a lightweight.

According to another aspect of the present invention, there is provided a drive device including: a board including an opening; a blade adjusting an aperture of the opening; and the above speed reducing mechanism provided on the board, wherein the drive force from the actuator is transmitted to the blade by engaging the engagement pin provided in the driven member with the cam slot provided in the decelerating member.

With such a configuration of the drive device, since the single decelerating member transmits the drive force from the actuator to the driven member, the number of the parts and the meshing points are reduced. This reduces the operational noise. Also, by the engagement of the engagement pin and the cam slot, which are respectively formed in the driven member and the decelerating member, the drive force from the actuator is transmitted to the driven member. This reduces the operational noise caused by the meshing of the gears. Further, since the number of the parts is reduced, a low cost can be maintained. Furthermore, the speed reducing mechanism is reduced in thickness by the decelerating member which has the sheet shape thinner than the face width of the rotor pinion portion. The drive device is reduced in thickness by the reduction device provided in the board. Moreover, since the number of the parts is reduced, a low cost can be maintained and a lightweight can be achieved.

According to another aspect of the present invention, there is provided a drive device including: the above speed reducing mechanism; and a lens attaching portion for holding a lens and provided in the driven member. With such a drive device having the above configuration, since the single decelerating member transmits the drive force from the actuator to the driven member, the number of the parts and the meshing points are reduced. This reduces the operational noise. Further, the speed reducing mechanism is reduced in thickness by the decelerating member which has the sheet shape thinner than the face width of the rotor pinion portion. The drive device is reduced in thickness by the reduction device provided in the board. Moreover, since the number of the parts is reduced, a low cost can be maintained and a lightweight can be achieved.

According to another aspect of the present invention, there is provided an optical instrument including the above drive device.

What is claimed is:

1. A drive device comprising:
a board including an opening;
a blade adjusting an aperture of the opening; and
a speed reducing mechanism including:
   a driven member; and
   a decelerating member transmitting a drive force from an actuator to the driven member,
   wherein:
   the driven member includes an engagement pin;
   the decelerating member includes:
      a teeth portion engaging a rotor pinion portion serving as the drive force from the actuator; and
      a cam slot engaging the engagement pin; and the decelerating member is rotatably supported and is formed into a sheet shape thinner than a face width of the rotor pinion portion;

wherein the drive force from the actuator is transmitted to the blade by engaging the engagement pin provided in the driven member with the cam slot provided in the decelerating member.

2. The speed reducing mechanism of claim 1, wherein the decelerating member is flexible.

3. The speed reducing mechanism of claim 1, wherein:
the teeth portion is formed at a peripheral portion of the decelerating member; and
the cam slot is formed between the teeth portion and a rotation center of the decelerating member.

4. The drive device of claim 1, wherein at least a part of the decelerating member overlaps the driven member in an optical axis direction.

5. The drive device of claim 1, wherein at least a part of the decelerating member overlaps the blade in an optical axis direction.

6. The drive device of claim 1, wherein the decelerating member and the blade are arranged on an identical side with respect to the driven member.

7. An optical instrument comprising
a drive device including:
  a board including an opening;
  a blade adjusting an aperture of the opening; and
  a speed reducing mechanism including:
    a driven member; and
    a decelerating member transmitting a drive force from an actuator to the driven member,
  wherein:
    the driven member includes an engagement pin;
    the decelerating member includes:
      a teeth portion engaging a rotor pinion portion serving as the drive force from the actuator; and
      a cam slot engaging the engagement pin; and
    the decelerating member is rotatably supported and is formed into a sheet shape thinner than a face width of the rotor pinion portion;
  wherein the drive force from the actuator is transmitted to the blade by engaging the engagement pin provided in the driven member with the cam slot provided in the decelerating member.

* * * * *